(12) United States Patent
Chang et al.

(10) Patent No.: US 8,390,732 B2
(45) Date of Patent: Mar. 5, 2013

(54) METHOD FOR ADJUSTING A FOCAL LENGTH OF A CAMERA

(75) Inventors: Keng-Tuan Chang, Taipei Hsien (TW); Pi-Jye Tsaur, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 360 days.

(21) Appl. No.: 12/764,916

(22) Filed: Apr. 21, 2010

(65) Prior Publication Data

US 2011/0096175 A1    Apr. 28, 2011

(30) Foreign Application Priority Data

Oct. 27, 2009   (CN) .......................... 2009 1 0308906

(51) Int. Cl.
*H04N 5/232*    (2006.01)
*G03B 13/00*    (2006.01)

(52) U.S. Cl. .................... 348/353; 348/346; 348/211.99
(58) Field of Classification Search .................... None
See application file for complete search history.

(56) References Cited

U.S. PATENT DOCUMENTS

| | | | |
|---|---|---|---|
| 2004/0165090 A1* | 8/2004 | Ning | 348/272 |
| 2004/0174434 A1* | 9/2004 | Walker et al. | 348/211.3 |
| 2010/0220202 A1* | 9/2010 | Roskowski | 348/211.3 |

\* cited by examiner

*Primary Examiner* — Albert Cutler
(74) *Attorney, Agent, or Firm* — Altis Law Group, Inc.

(57) ABSTRACT

One method of adjusting a focal length of a camera obtains a captured image of the camera by an application server, where a user can log onto the application server and decides if there is a need to adjust the focal length of the camera again. Another method obtains a captured image of the camera by an application server, determines if a quality of the captured image is acceptable by the application server, and sends the determination results to a mobile device. The focal length of the camera is adjusted again by checking the determination result on the mobile device.

8 Claims, 6 Drawing Sheets

METHOD FOR ADJUSTING A FOCAL LENGTH OF A CAMERA

BACKGROUND

1. Technical Field

Embodiments of the present disclosure relate to security surveillance technology, and particularly to a method for adjusting a focal length of a camera.

2. Description of Related Art

Currently, cameras are used to perform security surveillance by capturing images of specified spaces, and sending the captured images to a monitoring computer. Often, a focal length of the camera needs to be adjusted according to a change in the area around the camera. A first method is to use a camera that can automatically adjust the focal length of the camera. However, these cameras are often expensive. A second method is to adjust the focal length of each of the cameras manually. However, the second method needs at least two persons to adjust the focal length of the camera. In this method, a first person adjusts the focal length of the camera while a second person checks the adjustment on a monitor at the control center and gives feedback to the first person. It is inconvenient to adjust a plurality of cameras using the second method. Therefore, a prompt and efficient method for adjusting a focal length of a camera is desired.

DETAILED DESCRIPTION

All of the processes described below may be embodied in, and fully automated via, functional code modules executed by one or more general purpose computers or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
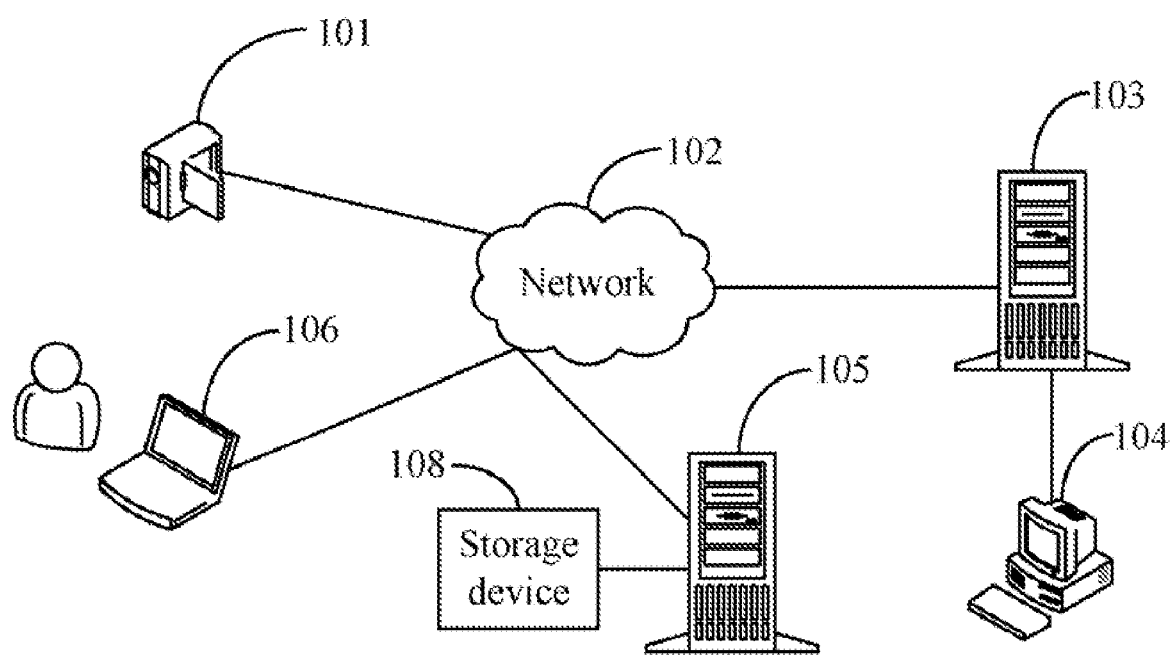
FIG. 1 is a schematic diagram of a first exemplary embodiment of a method for adjusting a focal length of a camera.
Figure 2:
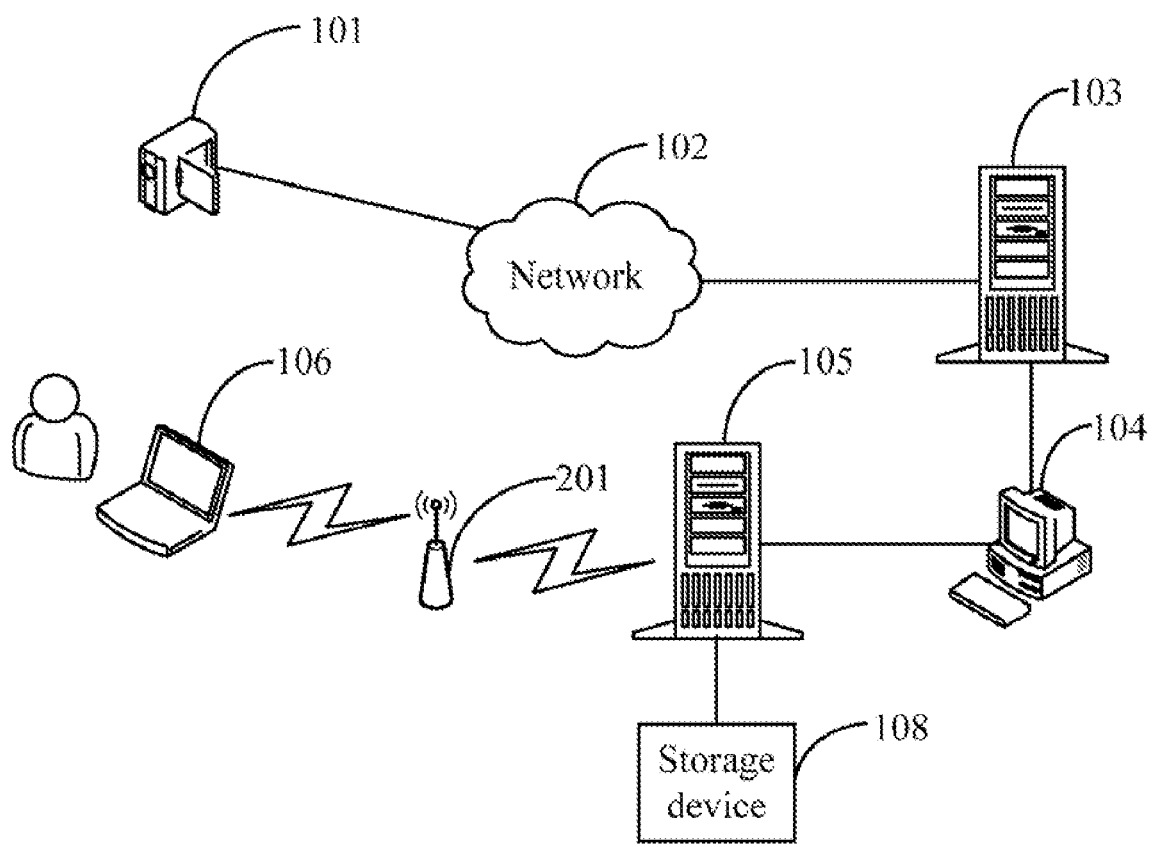
FIG. 2 is a schematic diagram of a second exemplary embodiment of a method for adjusting a focal length of a camera.
Figure 3:
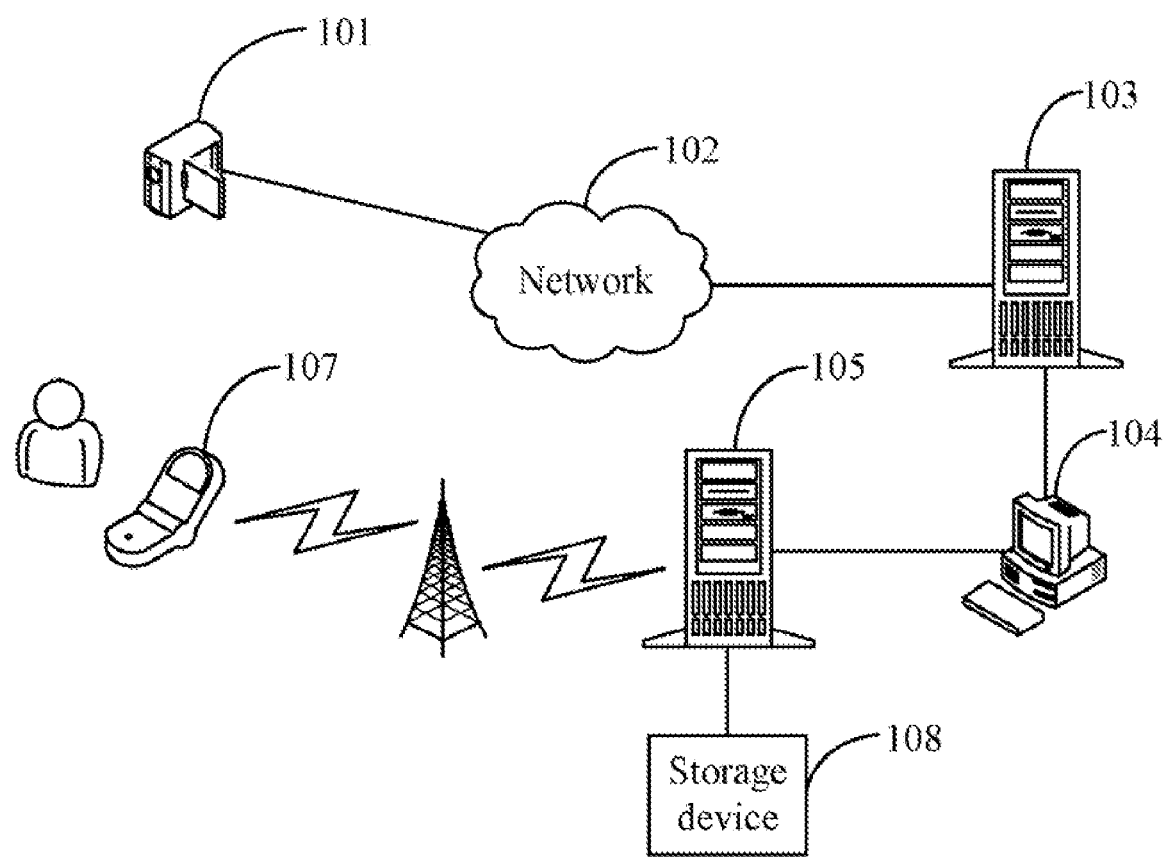
FIG. 3 is a schematic diagram of a third exemplary embodiment of a method for adjusting a focal length of a camera.

FIG. 1 is a schematic diagram of a first exemplary embodiment of a method for adjusting a focal length of a camera 101. In one embodiment, the camera 101 connects to a storage server 103, a web server 105, and a notebook computer 106 through a network 102. The storage server 103 and the web server 105 are further connected with a central server 104. The network 102 may be an intranet, the Internet or other suitable communication network. The web server 105 is allocated a specified Internet protocol (IP) address, and the notebook computer 106 can log onto the web server 105 by inputting the specified IP address in a browser (e.g., INTERNET EXPLORER) through the network 102. In another embodiment, the notebook computer 106 may connect with the web server 105 through an access point (AP) 201 (refers to FIG. 2), and the notebook computer 106 may be other suitable mobile device, such as a handset 107 in FIG. 3.

In one embodiment, the camera 101 may capture images, and send the captured images to the storage server 103 through the network 102. Then, the central server 104 obtains the captured images from the storage server 103, processes the captured images, and sends the processed images to the web server 105. A user can log onto the web server 105 using the notebook computer 106 to check the processed images. A detailed description will be given in FIG. 4.

In other embodiments, the central server 104 may calculate a definition of the captured image automatically (refers to FIG. 3), determine if the focal length of the camera 101 needs to be adjusted, and send the determination result to the handset 107. In one embodiment, the definition of the captured image is the degree of clarity of the image captured by the camera 101. The handset 107 may be some other suitable mobile devices, such as the notebook computer 106. A detailed description will be given in FIG. 5 and FIG. 6.

Figure 4:
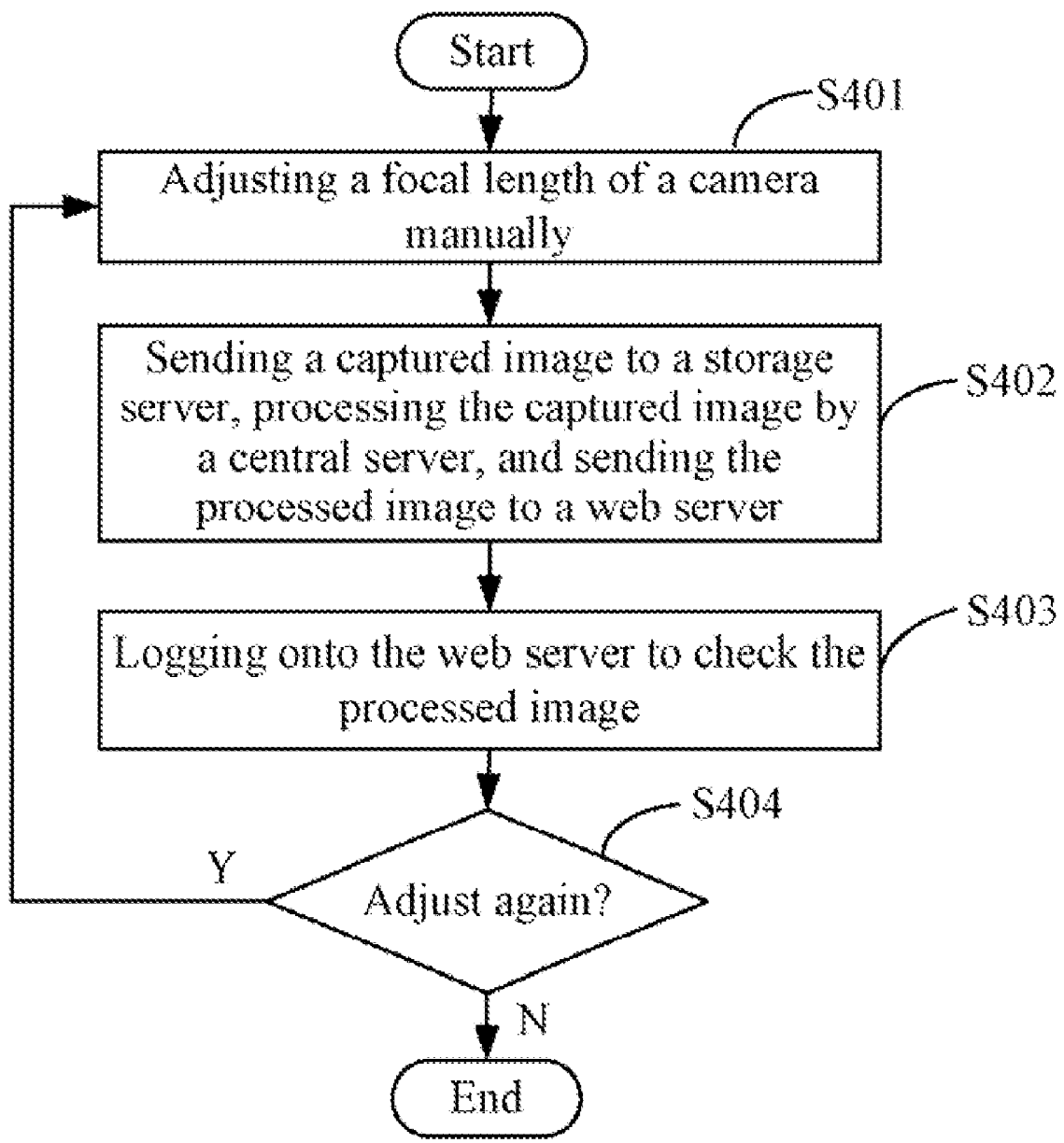
FIG. 4 is a flowchart of a first exemplary embodiment of a method for adjusting a focal length of a camera.

FIG. 4 is a flowchart of a first exemplary embodiment of a method for adjusting the focal length of the camera 101. Depending on the embodiment, additional blocks may be added, others removed, and the ordering of the blocks may be changed.

In block S401, a user adjusts the focal length of the camera 101 manually.

In block S402, the camera 101 sends a captured image to the storage server 103 through the network 102. The central server 104 obtains the captured image from the storage server 103, processes the captured image, sends the processed image to the web server 105, and saves the processed image in a storage device 108 of the web server 105. In one embodiment, the central server 104 processes the captured image by filtering noise from the captured image.

In block S403, the user logs on the web server 105 through the notebook computer 106 to check the processed image. In one embodiment, the notebook computer 106 communicates with the web server 105 through a wired connection (refers to FIG. 1) or a wireless connection (refers to FIG. 2 or FIG. 3). In another embodiment, the user may log onto the web server 105 through the handset 107 to check the processed image.

In block S404, the user determines if the focal length of the camera 101 needs to be adjusted again according to a quality of the processed image. If the quality of the processed image is not acceptable, the procedure returns to block S401. If the quality of the processed image is acceptable, the user stops adjustment of the focal length of the camera 101.

Figure 5:
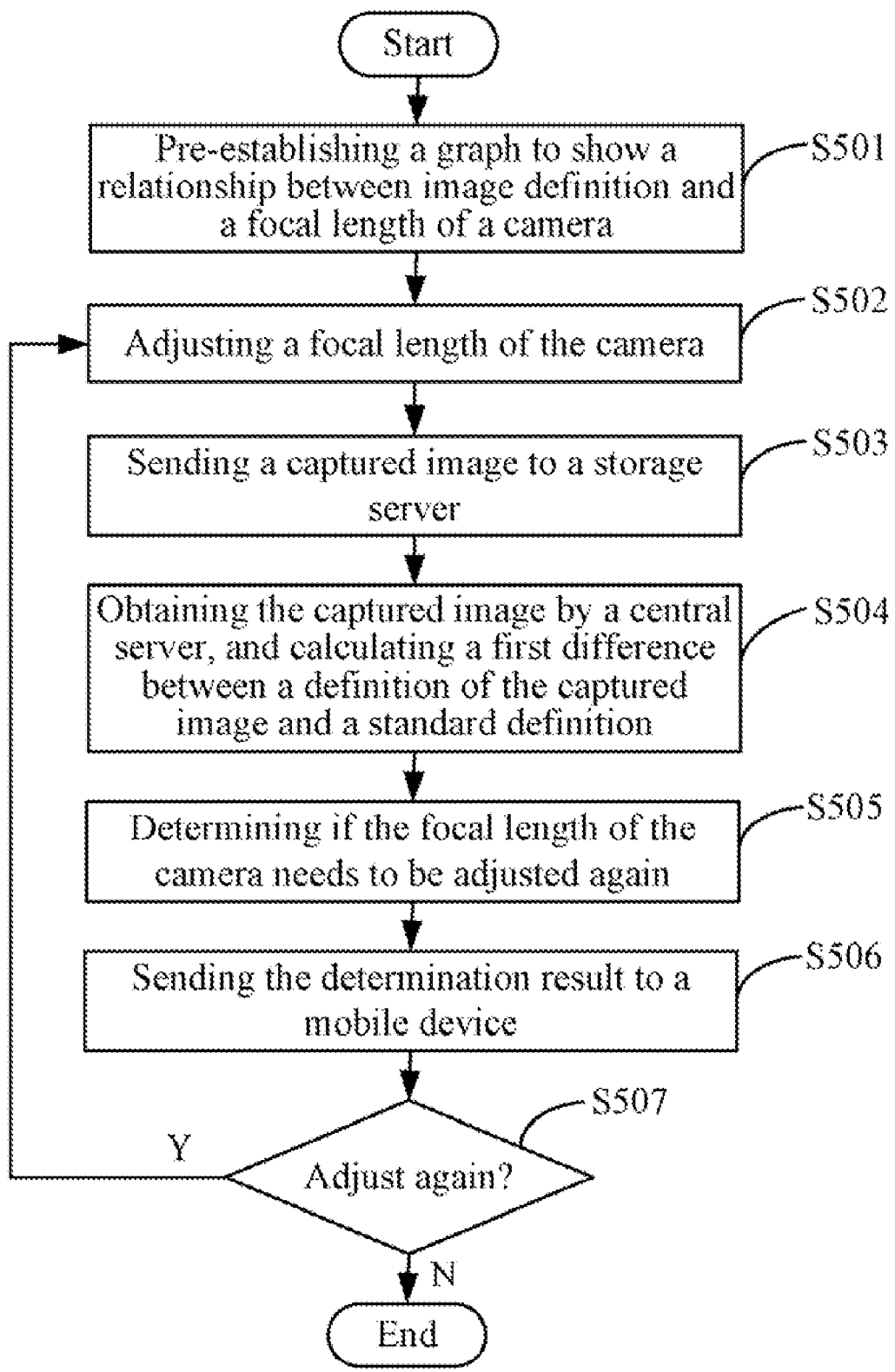
FIG. 5 is a flowchart of a second exemplary embodiment of a method for adjusting a focal length of a camera.

FIG. 5 is a flowchart of a second exemplary embodiment of a method for adjusting the focal length of the camera 101. Depending on the embodiment, additional blocks may be added, others removed, and the ordering of the blocks may be changed.

Figure 6:
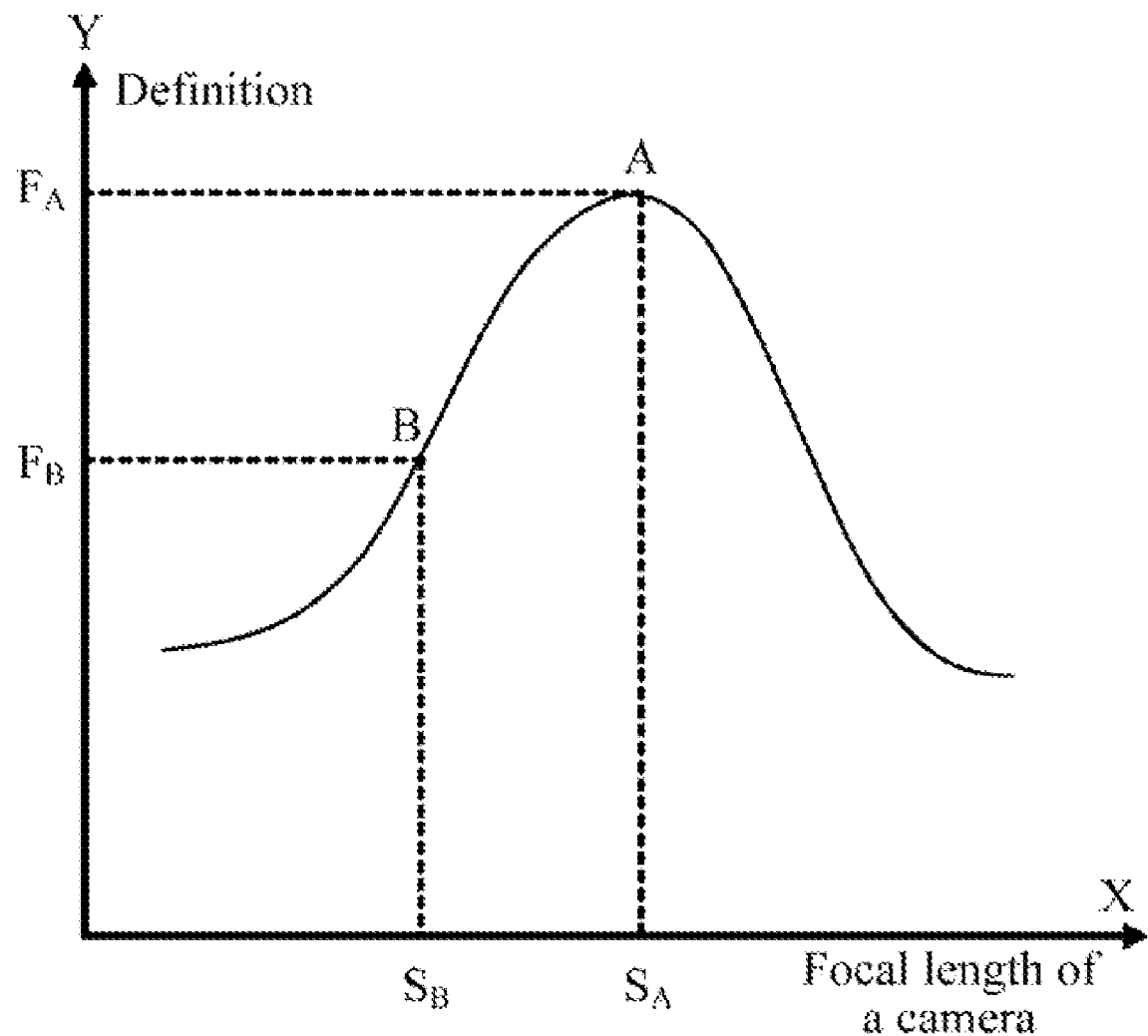
FIG. 6 is a graph showing the relationship between an image definition and a focal length of a camera.

In block S501, a graph is pre-established to show a relationship between an image definition and a focal length of the camera 101. Referring to FIG. 6, an X-axis of the graph represents the focal length of the camera 101, and a Y-axis of the graph represents the image definition. In one embodiment, a maximum value of the image definition (i.e., $F_A$) in the graph being regarded as a standard definition.

In another embodiment, a plurality of graphs may be pre-established according to different light intensities that may occur in the area around the camera 101. Each of the plurality of graphs shows a relationship between the image definition and the focal length of the camera 101 under a corresponding light intensity surrounding the camera 101. The central server 104 selects a corresponding graph according to a current light intensity surrounding the camera 101, and determines if the focal length of the camera 101 needs to be adjusted. The light intensity surrounding the camera 101 is detected by a charge coupled device (CCD) or a complementary metal oxide semiconductor (CMOS) transistor of the camera 101.

In block S502, the user adjusts the focal length of the camera 101 manually.

In block S503, the camera 101 sends a captured image to the storage server 103 through the network 102.

In block S504, the central server 104 obtains the captured image from the storage server 103, calculates a definition of the captured image, and further calculates a first difference between the definition of the captured image and the standard definition. Referring to FIG. 6, supposing that the definition of the captured image is $F_B$, the standard definition is $F_A$, thus, the first difference is equal to "$F_B-F_A$." In other embodiments, the central server 104 may further filter noise from the captured image before calculating the definition of the captured image.

In block S505, the central server 104 determines if the focal length of the camera 101 needs to be adjusted again according to the first difference. If the first difference is less than or equal to a preset value (e.g., 1 millimeter), the central server 104 determines that the focal length of the camera 101 does not need to be adjusted again. If the first difference is greater than the preset value, the central server 104 determines that the focal length of the camera 101 needs to be adjusted again.

In block S506, the central server 104 sends the determination result to the handset 107 using a short message service (SMS) or a multimedia message service (MMS), and saves the captured image in the web server 105. In other embodiments, the central server 104 may further send the captured image to the handset 107 using the MMS.

In another embodiment, if the focal length of the camera 101 needs to be adjusted again, the central server 104 may further calculate a second difference between a focal length of the camera 101 at a current position and a focal length corresponding to the maximum value of the image definition in the graph, and send the second difference to the handset 107. The user may adjust the focal length of the camera 101 according to the second difference. Referring to FIG. 6, supposing that the focal length of the camera 101 at the current position is $S_B$, the focal length corresponding to the maximum value of the image definition is $S_A$, thus, the second difference is equal to "$S_B-S_A$."

In block S507, the user checks the determination result on the handset 107 and determine if the focal length of the camera 101 needs to be adjusted again. If the focal length of the camera 101 needs to be adjusted again, the procedure returns to block S502. If the focal length of the camera 101 does not need to be adjusted again, the procedure ends.

In other embodiment, the storage server 103, the central server 104, and the web server 105 may be combined to form an application server. Then, the application server accomplishes all of tasks executing by the storage server 103, the central server 104, and the web server 105.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for adjusting a focal length of a camera, comprising:
    pre-establishing a plurality of graphs according to different light intensities surrounding the camera, each of the plurality of graphs showing a relationship between an image definition and a focal length of the camera under a corresponding light intensity surrounding the camera, and selecting a corresponding graph according to a current light intensity surrounding the camera by an application server, wherein an X-axis of the selected graph represents the focal length of the camera, a Y-axis of the selected graph represents the image definition, a maximum value of the image definition in the selected graph being regarded as a standard definition;
    sending a captured image from the camera to the application server when the focal length of the camera is adjusted;
    calculating a definition of the captured image by the application server, and calculating a first difference between the definition of the captured image and the standard definition;
    determining if the focal length of the camera needs to be adjusted again according to the first difference by the application server;
    sending the determination result from the application server to a mobile device;
    adjusting the focal length of the camera again or stopping adjustment of the focal length of the camera according to the determination result received by the mobile device.

2. The method according to claim 1, wherein the step of determining if the focal length of the camera needs to be adjusted again according to the first difference by the application server comprises:
    determining that the focal length of the camera does not need to be adjusted again if the first difference is less than or equal to a preset value; or
    determining that the focal length of the camera needs to be adjusted again if the first difference is greater than the preset value.

3. The method according to claim 1, wherein the determination result is sent from the application server to the mobile device using a short message service (SMS) or a multimedia message service (MMS).

4. The method according to claim 3, further comprising: sending the captured image from the application server to the mobile device using the MMS.

5. The method according to claim 1, further comprising:
    calculating a second difference between a focal length of the camera at a current position and a focal length corresponding to the maximum value of the image definition in the graph, if the focal length of the camera needs to be adjusted again, and sending the second difference to the mobile device; and
    adjusting the focal length of the camera according to the second difference.

6. The method according to claim 1, before the calculating step further comprising: filtering noise from the captured image.

7. The method according to claim 1, wherein the light intensity surrounding the camera is detected by the a charge coupled device (CCD) or a complementary metal oxide semiconductor (CMOS) transistor of the camera.

8. The method according to claim 1, wherein the mobile device communicates with the application server through a wired connection or a wireless connection.

* * * * *